US009479944B2

(12) United States Patent
Thiel et al.

(10) Patent No.: US 9,479,944 B2
(45) Date of Patent: Oct. 25, 2016

(54) METHOD AND APPARATUS FOR DERIVING CELL CHARACTERISTIC VALUES

(71) Applicant: Viavi Solutions UK Limited, Berkshire (GB)

(72) Inventors: Stefan Thiel, Newbury (GB); Peter Kenington, Chepstow (GB); Gareth Smith, Berkshire (GB); Michael Joseph Flanagan, Chester, NJ (US)

(73) Assignee: Viavi Solutions UK Limited, Berkshire (GB)

( * ) Notice: Subject to any disclaimer, the term of this patent is extended or adjusted under 35 U.S.C. 154(b) by 211 days.

(21) Appl. No.: 14/263,706

(22) Filed: Apr. 28, 2014

(65) Prior Publication Data

US 2015/0105086 A1 Apr. 16, 2015

Related U.S. Application Data

(60) Provisional application No. 61/891,800, filed on Oct. 16, 2013, provisional application No. 61/894,781, filed on Oct. 23, 2013.

(51) Int. Cl.
*H04W 64/00* (2009.01)
*H04W 16/22* (2009.01)
*H04W 24/02* (2009.01)
*G01S 5/02* (2010.01)

(52) U.S. Cl.
CPC ............ *H04W 16/22* (2013.01); *G01S 5/0252* (2013.01); *H04W 24/02* (2013.01); *H04W 64/00* (2013.01)

(58) Field of Classification Search
CPC ... H04W 16/22; H04W 24/02; H04W 64/00; H04W 24/08
See application file for complete search history.

(56) References Cited

U.S. PATENT DOCUMENTS

| 8,077,090 B1 * | 12/2011 | Chintalapudi | G01S 5/0252 342/450 |
| 2013/0329581 A1 * | 12/2013 | Chen | H04W 64/00 370/252 |
| 2015/0103681 A1 | 4/2015 | Thiel et al. | |

OTHER PUBLICATIONS

"RF Fingerprinting Location Techniques" in "Handbook of Position Location" Sep. 16, 2011; Rafael Saraiva.*
European Search Report corresponding to EP 15 165 513, mailed Sep. 24, 2015, 7 pages.
Saraiva et al., "Chapter 15—RF Fingerprinting Location Techniques", Handbook of Position Location, Sep. 16, 2011, p. 487-520, XP55114167.
European Search Report corresponding to EP 15 165 511, mailed Sep. 24, 2015, 7 pages.

(Continued)

*Primary Examiner* — Nathan Mitchell
*Assistant Examiner* — Dung Lam
(74) *Attorney, Agent, or Firm* — Harrity & Harrity, LLP

(57) ABSTRACT

A method of deriving cell characteristic values for cells within a wireless communication network. The method for determining a set of cells for which cell characteristic values are to be derived, and using a genetic algorithm to derive cell characteristic values for the set of cells based at least partly on measurement data obtained by wireless communication subscriber units within the wireless communication network.

21 Claims, 11 Drawing Sheets

(56) References Cited

OTHER PUBLICATIONS

Manuel J. Magro and Carl J. Debono, "A Genetic Algorithm Approach to User Location Estimation in UMTS Networks", Sep. 12, 2007, EUROCON, 4 pages.

Rafael Saralva Campos and Lisandro Lovisolo, "Mobile Station Location using Genetic Algorithm Optimized Radio Frequency Fingerprinting", 2010, The $7^{th}$ International Telecommunications Symposium, 5 pages.

* cited by examiner

| Cell 1 | | Cell 2 | | Cell 3 | | Cell 4 | | Cell 5 | | | Cell 10 | |
|---|---|---|---|---|---|---|---|---|---|---|---|---|
| -23.5 | -40.2 | -22.5 | -43.2 | -26.5 | -41.2 | -30.3 | -35.2 | -22.5 | -40.5 | --- | -23.5 | -40.2 |
| SLP | I'CPT | SLP | I'CPT | SLP | I'CPT | SLP | I'CPT | SLP | I'CPT | | SLP | I'CPT |
FIG. 4
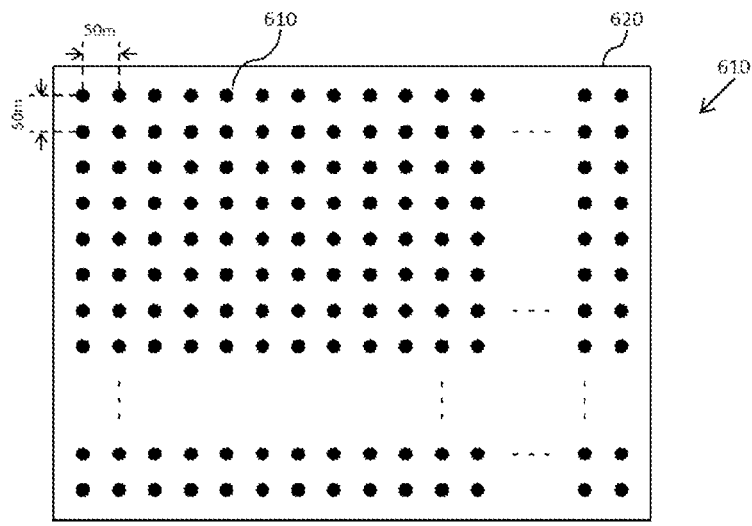
FIG. 6
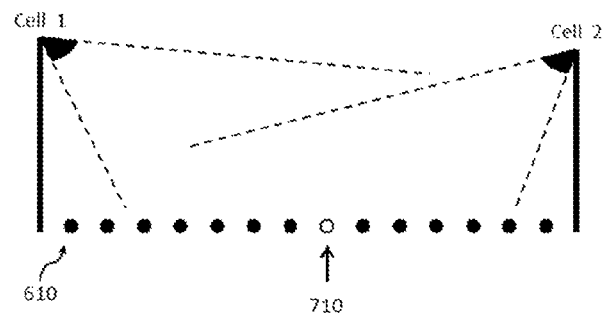
FIG. 7

METHOD AND APPARATUS FOR DERIVING CELL CHARACTERISTIC VALUES

PRIORITY CLAIM TO RELATED APPLICATIONS

This U.S. Patent Application claims the benefit of, and priority under §§119(e) and 120, to U.S. Provisional Application No. 61/891,800 filed Oct. 16, 2013, and U.S. Provisional Application No. 61/894,781 filed Oct. 23, 2013, the disclosures of which are all incorporated herein by reference.

FIELD OF THE INVENTION

The field of the invention relates to a method and apparatus for deriving cell characteristic values, and in particular to a method and apparatus for deriving cell characteristic values for cells within a wireless communication network.

BACKGROUND OF THE INVENTION

Wireless communication networks, such as the $3^{rd}$ Generation (3G) and $4^{th}$ Generation (4G) of wireless telephone standards and technology, are well known. Examples of such 3G and 4G standards and technology are the Universal Wireless Telecommunications System (UMTS™) and the Long Term Evolution (LTE) respectively, developed by the $3^{rd}$ Generation Partnership Project (3GPP™) (www.3gpp.org).

These $3^{rd}$ and $4^{th}$ generations of wireless communications, have generally been developed to support macro-cell wireless phone communications, and more recently femto-cell wireless phone communications. Here the 'phone' may be a smart phone, or another wireless or portable communication unit that is linked wirelessly to a network through which calls etc. are connected. Henceforth all these devices will be referred to as wireless communication subscriber units. Calls may be data, video, or voice calls, or a combination of these.

Typically, wireless communication subscriber units, or User Equipment (UE) as they are often referred to in 3G parlance, communicate with a Core Network of the 3G or 4G wireless communication network. This communication is via a Radio Network Subsystem. A wireless communication network typically comprises a plurality of Radio Network Subsystems. Each Radio Network Subsystem comprises one or more cells, to which wireless communication subscriber units may attach, and thereby connect to the network. A basestation may serve a cell. Each basestation may have multiple antennas, each of which serves one sector of the cell.

Geolocation is the real-world geographical location of objects, and geolocation of wireless communication subscriber units is an increasingly important and desirable service. There are many mechanisms by which users of a wireless communication network may be located, whilst they are using the system. These include use of the global positioning system (GPS), if the wireless device is equipped with a GPS receiver and the user has enabled this on his/her device. However, many users do not enable GPS on their devices as it is typically a significant power drain on the device's battery.

Alternative known techniques for geolocating a wireless communication subscriber unit within a wireless communication network use measurement data obtained by the wireless communication subscriber unit relating to individual cells (or cell sectors) within the wireless communication network, and using such measurement data in conjunction with cell characteristic data to derive location estimates for the wireless communication. For example, such measurement data and cell characteristic data may be used to derive estimates of the distance between the wireless communication subscriber unit and the/each cell antenna. The derived distance estimate(s) may then be used along with known cell antenna locations to determine a location of the wireless communication subscriber unit.

One such technique uses signal strength measurements for cells visible to the wireless communication to determine the approximate distance of the wireless communication subscriber unit from the respective basestation for each of the cells. This distance information may then be used in conjunction with the known location for the basestations to estimate the location of the wireless communication subscriber unit.

FIG. 1 illustrates the decay of signal strength with increasing distance from a basestation site. The rate of decay varies depending upon the environment in which the basestation is placed. For example, in a city with many structures to attenuate the signal, the rate of decay of signal strength with distance will typically be relatively high, perhaps decaying at a rate proportional to $1/r^4$, where r is the radial distance from the basestation site. Conversely, in the countryside where there are fewer structures etc. to attenuate the signal, the rate of decay of signal strength with distance will typically be lower than in a city, for example reduced to a rate proportional to $1/r^2$.

Whilst these general values for signal strength decay rates may be used as a guide or a starting point for estimating the distance between a wireless communication subscriber unit and a basestation site, they will typically vary significantly from site to site, even within a given (e.g. urban) environment. Clearly, if this variation is known accurately for a given cell (or cell sector), at a given receive location, then it is possible to utilise signal strength alone to provide an accurate distance estimate between a wireless communication subscriber unit and a basestation site. If accurate distance estimates can be determined for a number of cell sites (e.g. a minimum of three), the intersection of signal strength contours (defined by the distance estimates) can be used to determine the likely location of the wireless communication subscriber unit. This situation is shown in FIG. 2. In practice, using a larger number of cell sites is beneficial, since this provides a greater number of sample points and minimises the impact of a gross error arising from measurements based on a particular cell-site.

In FIG. 2, three contours are shown 210, 220, 230, one for each of the three base-stations. In a perfect system, with perfectly circular contours (as shown), the intersection of the contours 210, 220, 230 at a single point would provide a precise location. In a real scenario, however, the modelled signal strength contours will be far from accurate and the measured vs modelled values will lead to a gap (as shown), within which the wireless communication subscriber unit is likely to be located. So long as this 'gap' is sufficiently small, a sufficiently accurate location estimate may be obtained.

Alternative known techniques for geolocating a wireless communication subscriber unit within a wireless communication network use measurement data obtained by the wireless communication subscriber unit comprising signal transmission and reception timing information. Wireless communication networks fall into two broad categories:

(i) Synchronous networks, such as Code Division Multiple Access systems, e.g. CDMA 2000. In synchronous networks, the timing offset between different basestations is constant. The amount of the offset is known to wireless mobile communication units that are using the network. In the example of CDMA2000, the timing offset is both known and constant, because each basestation's timing is locked to a Global Positioning System satellite.

(ii) Asynchronous networks, such as the Universal Mobile Telephone System (UMTS). In asynchronous networks, the timing offset between different basestations is not constant. Wireless mobile communication units in asynchronous networks are not provided with information about the timing offset between basestation timing references. In addition, these references drift over time, relative both to absolute timing references, as well as to each other.

In a synchronous wireless communication network, the known timing offset information provides the cell characteristic data that make it relatively straight forward to derive a measurement of the location of a wireless communication subscriber unit from signal timing information. However, in an asynchronous network, it is much more difficult to derive a location estimate for a wireless communication subscriber unit from signal timing information because of the lack of cell timing offset information being available.

Furthermore, although LTE networks comprise synchronous networks, not every LTE network reports timing advance/offset information, and without this cell characteristic information the accurate judgement of distance from a cell site can be difficult.

Still further alternative techniques for geolocating a wireless communication subscriber unit within a wireless communication network are known that use alternative forms of measurement data obtained by the wireless communication subscriber unit, such as signal-to-noise ratio data, Arbitrary Strength Unit (ASU) data (for example that is proportional to the received signal strength measured by the wireless communication subscriber unit), OTDOA (Observed Time Difference Of Arrival), RSCP (received signal code power), etc.

A problem with each of these geolocation techniques that use measurement data obtained by the wireless communication subscriber unit in conjunction with cell characteristic data to derive location estimates for the wireless communication is that of deriving and keeping up-to-date cell specific characteristic data in a cost effective manner.

Thus, there is a need for a method and apparatus for enabling characteristics for cells within wireless communication networks to be accurately modelled.

SUMMARY OF THE INVENTION

Accordingly, the invention seeks to mitigate, alleviate or eliminate one or more of the abovementioned disadvantages singly or in any combination.

According to a first aspect of the present invention, there is provided a method of deriving cell characteristic values for cells within a wireless communication network. The method comprises determining a set of cells for which signal strength attenuation characteristic values are to be derived, and using a genetic algorithm to derive cell characteristic values for the set of cells based at least partly on measurement data obtained by wireless communication subscriber units within the wireless communication network.

In this manner, cell characteristic information may be derived on a per cell basis from measurement information provided by wireless communication subscriber units, enabling characteristics for cells within wireless communication networks to be accurately modelled.

In some optional embodiments, the cell characteristic values to be derived comprise at least one cell specific parameter which decays or degrades or alters with distance between a wireless communication subscriber unit and a cell-site.

In some optional embodiments, the method may comprise determining a set of cells for which cell characteristic values are to be derived, generating a first generation of chromosome strings, each chromosome string comprising at least one cell characteristic value for each cell within the determined set of cells, calculating a fitness score for each chromosome string within the first generation of chromosome strings based at least partly on measurement data obtained by wireless communication subscriber units within the wireless communication network, generating at least one further generation of chromosome strings, calculating a fitness score for each chromosome string within the at least one further generation of chromosome strings based at least partly on measurement data obtained by wireless communication subscriber units within the wireless communication network, and deriving cell characteristic values for the set of cells based at least partly on the calculated fitness scores for the first and at least one further generation of chromosome strings.

In some optional embodiments, the first generation of chromosome strings may comprise random cell characteristic values.

In some optional embodiments, calculating a fitness score for a chromosome string may comprise:
  defining a plurality of signature points, each signature point representing a geographical location;
  calculating an expected measurement value for at least one cell at each signature point;
  matching each of a plurality of measurement reports received from wireless communication subscriber units to one of the signature points based at least partly on the expected measurement values for the signature points;
  calculating a fitness score for each measurement report based at least partly on the or each expected measurement value for the respective signature point and corresponding information from the measurement report; and
  calculating the fitness score for the chromosome string based at least partly on the calculated fitness scores for the plurality of measurement reports.

In some optional embodiments, the method may comprise calculating the fitness scores for the chromosome string by summing the fitness scores for the measurement reports.

In some optional embodiments, generating at least one further generation of chromosome strings may comprise:
  deriving parent chromosome strings to form part of the at least one further generation of chromosome strings; and
  performing a crossover between parent chromosome strings to generate child chromosome strings to form part of the at least one further generation of chromosome strings.

In some optional embodiments, generating at least one further generation of chromosome strings may further comprise performing mutation of the child chromosome strings.

In some optional embodiments, generating at least one further generation of chromosome strings may comprise identifying at least one chromosome string from a current generation of chromosome strings comprising a highest fitness score and including the identified at least one chromosome string from the current generation of chromosome strings in the at least one further generation of chromosome strings.

In some optional embodiments, the method may comprise generating further generations of chromosome strings until at least one chromosome string comprising a suitable solution for cell attenuation characteristic values for the set of cells is found.

In some optional embodiments, a chromosome string comprising a suitable solution for cell characteristic values for the set of cells may be found when no chromosome string in a succeeding generation of chromosome strings comprises a higher fitness score than that chromosome string.

In some optional embodiments, the method may comprise deriving cell characteristic values comprising at least one of:
  signal strength characteristic values;
  timing offset characteristic values;
  observed time difference of arrival values; and
  signal-to-noise characteristic values.

In some optional embodiments, the method may further comprise storing the derived cell characteristic values within at least one data storage device.

According to a second aspect of the present invention, there is provided a method of generating a cell characteristic contour model for at least one cell within a wireless communication network. The method comprises deriving at least one cell characteristic value for the at least one cell within the wireless communication network in accordance with the first aspect of the present invention, and generating a cell characteristic contour model for the at least one cell based at least partly on the at least one derived cell characteristic value.

According to a third aspect of the present invention, there is provided a method of geolocating a wireless communication subscriber unit. The method comprises deriving cell characteristic values for cells within a wireless communication network in accordance with the first aspect of the present invention.

In some optional embodiments, the method may further comprise receiving measurement data for a set of cells within the wireless communication network obtained by the wireless communication subscriber unit, determining a distance between the wireless communication subscriber unit and an antenna for each cell within the set of cells based at least partly on:
  (i) the derived cell characteristic values for the set of cells; and
  (ii) the received measurement data for the set of cells within the wireless communication network obtained by the wireless communication subscriber unit; and
  (iii) determining a geolocation of the wireless communication subscriber unit based at least partly on the determined distance between the wireless communication subscriber unit and an antenna for each cell within the set of cells.

In some optional embodiments, the cell characteristic values may comprise timing offset values and the method may further comprise:
  receiving measurement data for a set of cells within the wireless communication network obtained by the wireless communication subscriber unit, the measurement data comprising timing data;
  applying the timing offset values to the received timing data;
  computing timing difference values for pairs of cells based at least partly on the offset timing data; and
  determining a geolocation of the wireless communication subscriber unit based at least partly on the computed timing difference values.

According to a fourth aspect of the present invention, there is provided a non-transitory computer program product having executable program code stored therein for performing a method of deriving cell characteristic values for cells within a wireless communication network. The program code operable for determining a set of cells for which cell characteristic values are to be derived, and using a genetic algorithm to derive cell characteristic values for the set of cells based at least partly on measurement data obtained by wireless communication subscriber units within the wireless communication network.

In some optional embodiments, the non-transitory computer program product may comprise at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

According to a fifth aspect of the present invention, there is provided a geolocation system comprising at least one cell characteristic value derivation component arranged to: determine a set of cells within a wireless communication network for which cell characteristic values are to be derived, and use a genetic algorithm to derive cell characteristic values for the set of cells based at least partly on measurement data obtained by wireless communication subscriber units within the wireless communication network In some optional embodiments, the at least one cell characteristic value derivation component may be arranged to:
  determine a set of cells within a wireless communication network for which cell characteristic values are to be derived;
  generate a first generation of chromosome strings, each chromosome string comprising at least one cell characteristic value for each cell within the determined set of cells;
  calculate a fitness score for each chromosome string within the first generation of chromosome strings based at least partly on measurement data obtained by wireless communication subscriber units within the wireless communication network;
  generate at least one further generation of chromosome strings;
  calculate a fitness score for each chromosome string within the at least one further generation of chromosome strings based at least partly on measurement data obtained by wireless communication subscriber units within the wireless communication network; and
  derive cell characteristic values for the set of cells based at least partly on the calculated fitness scores for the first and at least one further generation of chromosome strings.

In some optional embodiments, the at least one signal strength attenuation characteristic value derivation component may be arranged to store the derived signal strength attenuation characteristic values within at least one data storage device.

BRIEF DESCRIPTION OF THE DRAWINGS

Embodiments of the invention will be described, by way of example only, with reference to the accompanying drawings, in which:

FIG. 4 illustrates an example of such a chromosome string.

FIG. 6 illustrates an example of a grid of signature points.

FIG. 7 illustrates a simplistic two dimensional visualisation of finding a closest matching signature point for a measurement report.

DETAILED DESCRIPTION OF EMBODIMENTS OF THE INVENTION

Figure 1:
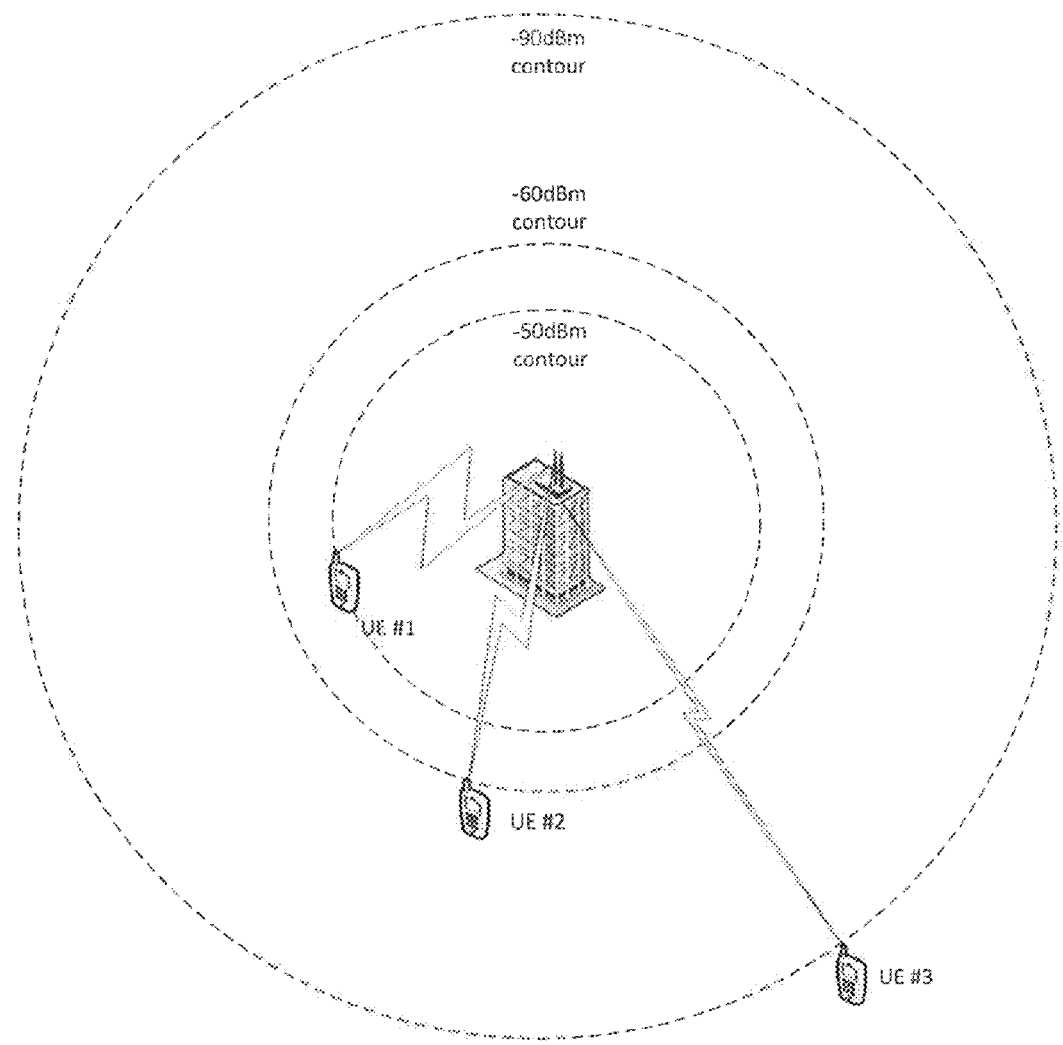
FIG. 1 illustrates the decay of signal strength with increasing distance from a basestation site.
Figure 2:
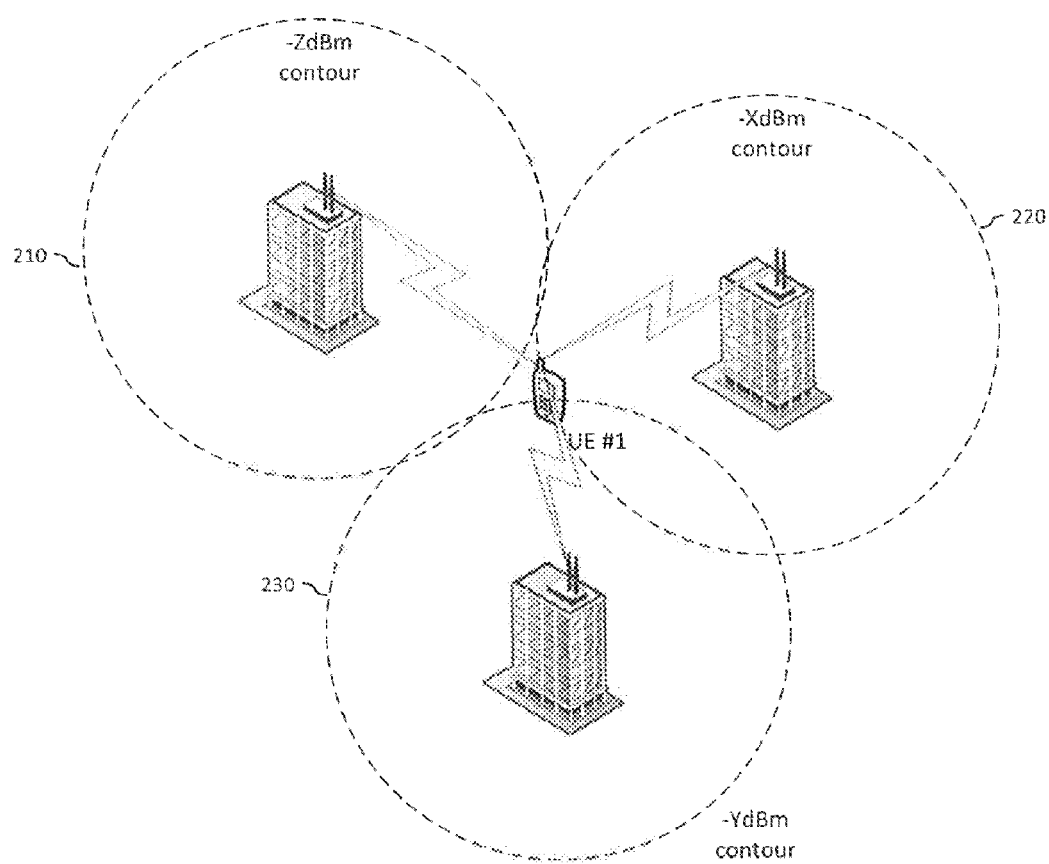
FIG. 2 illustrates the intersection of signal strength contours for a plurality of cells within a wireless communication network.

Examples of the invention will be described in terms of a system and a method for deriving signal strength attenuation characteristic values for cells within a wireless communication network, such as a network implemented in accordance with the 3$^{rd}$ Generation (3G) and/or 4$^{th}$ Generation (4G) of wireless telephone standards and technology. Examples of such 3G and 4G standards and technology is the Universal Wireless Telecommunications System (UMTS™) and Long Term Evolution (LTE), developed by the 3$^{rd}$ Generation Partnership Project (3GPP™) (www.3gpp.org).

In order to accurately model cell characteristic contours for cells within wireless communication networks, it is necessary to ascertain accurate cell characteristic values. For example, to model signal strength contours for cells, it is necessary to ascertain accurate attenuation characteristic values such as the slope of the signal attenuation with distance from the basestation sites for the cells, as well as the 'starting point' for the graph, known as the intercept point. Determining these cell characteristic values for base-stations within a network (and refining the values with time, as the network or environment evolves) allows accurate position estimates to be determined purely from received measurement data, for example signal strength information (such as: Reference Signal Received Power (RSRP) and/or Received Signal Strength Indicator (RSSI) and/or Received Signal Code Power (RSCP) in LTE parlance) and a knowledge of the basestation's identity (and hence location).

In accordance with some examples of the present invention there is provided a method and apparatus therefor, the method comprising deriving cell characteristic values for cells within a wireless communication network. The method comprises determining a set of cells for which cell characteristic values are to be derived, and using a genetic algorithm to derive cell characteristic values for the set of cells based at least partly on measurement data obtained by wireless communication subscriber units within the wireless communication network. In accordance with some exemplary embodiments, the method comprises generating a first generation of chromosome strings, each chromosome string comprising at least one cell characteristic value for each cell within the determined set of cells, calculating a fitness score for each chromosome string within the first generation of chromosome strings based at least partly on measurement data obtained by wireless communication subscriber units within the wireless communication network, generating at least one further generation of chromosome strings, calculating a fitness score for each chromosome string within the at least one further generation of chromosome strings based at least partly on measurement data obtained by wireless communication subscriber units within the wireless communication network, and deriving cell characteristic values for the set of cells based at least partly on the calculated fitness scores for the first and at least one further generation of chromosome strings.

Figure 3:
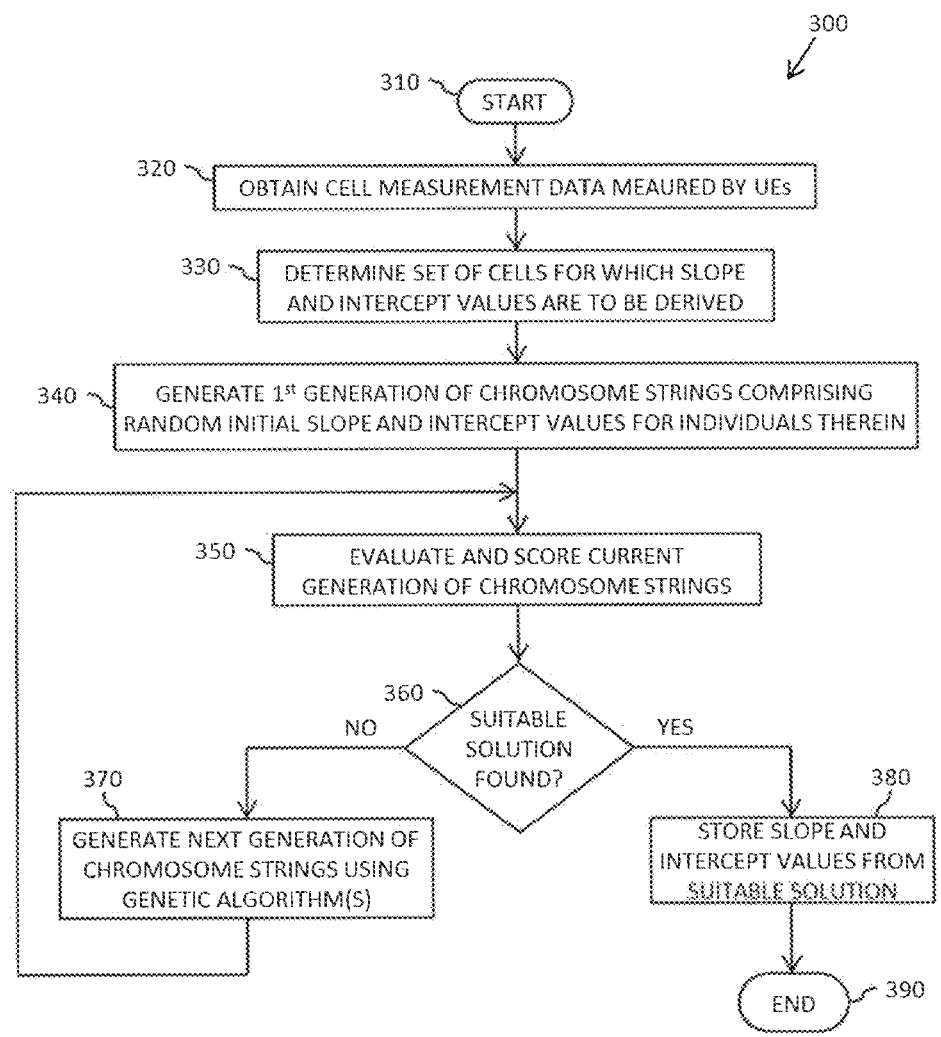
FIG. 3 illustrates a simplified flowchart of an example of a method of deriving signal strength attenuation characteristic values for cells within a wireless communication network.

Referring first to FIG. 3, there is illustrated a simplified flowchart 300 of an example of a method of deriving cell characteristic values for cells within a wireless communication network. Specifically, the example illustrated in FIG. 3 comprises a method of deriving signal strength attenuation characteristic values for cells within a wireless communication network. The method starts at 310, and moves on to step 320 where cell measurement data measured by wireless communication subscriber units, or User Equipment (UEs) in 3G/4G parlance, is obtained. For example, such cell measurement data may comprise, or be obtained from, measurement report messages provided by UEs over a period of time, for example as part of a cell selection/reselection process or otherwise. Such cell measurement data may comprise cell IDs (a cell ID comprising a unique identifier for a particular cell) for cells visible to the respective UEs along with measurement data for the strength of signals from the respective cells as measured by the respective UEs. Each such measurement report typically comprises signal strength data for cells measured by the respective UE at substantially the same time. As such, the signal strength measurement data provided within a measurement report will relate to substantially the same location for the UE (i.e. the location of the UE at the time the signal strength measurements were taken).

Having obtained the cell measurement data at step 320, the method of the illustrated example moves on to step 330, where a set of cells for which attenuation characteristic values (e.g. slope and intercept values in the illustrated example) are to be derived is determined. For example, such a set of cells may be determined by taking an initial cell ID referenced within the obtained cell measurement data. This initial cell ID may then be added to with further cell IDs that are also referenced within the same measurement report messages as the initial cell ID to form the set of cells for which attenuation characteristic values are to be derived. In this manner, all of the cell IDs within the set of cells are linked by at least one common cell ID with which they are referenced in a particular measurement report message.

In some examples of the present invention, given a set of measurement report messages for an entire wireless communication network (for example a whole day's worth of measurement report messages for the entire wireless communication network), all cell IDs referenced within the set of measurement report messages may be identified. A 'bucket' may then be created for each referenced cell ID, and each measurement report message referencing the respective cell ID can then be placed within the corresponding bucket. The measurement reports within a bucket may then be used to determine a set of cells for which signal strength attenuation characteristic values are to be derived, with the cell ID for which the bucket was initially created comprising the initial cell ID and further cell IDs within the set being extracted from the message report messages within the bucket.

Determining a set of cells in this manner enables the wireless communication network to be partitioned into manageable 'chunks' to reduce the number of cells (and thus the number of varying parameters) to a manageable amount from a processing perspective. Repeating the method of FIG. 3 for different sets of cells enables the complete network to be covered over a number of iterations. It is contemplated that sets of, say, approximately 20 cells are created, although this is only an approximate target size and is for the most part dependent on the processing resource available etc.

Referring back to FIG. 3, having determined the set of cells for which slope and intercept values are to be derived, the method moves on to step 340 where a first generation of 'chromosome' strings are generated, each chromosome string comprising the signal strength attenuation characteristic values (i.e. slope and intercept values in the illustrated example) for each cell within the determined set of cells.

FIG. 4 illustrates an example of such a chromosome string. As illustrated in FIG. 4, each chromosome string is made up of 'candidate solutions' for the cell characteristic values (i.e. the slope and intercept values in the illustrated example) for the set of cells. Each candidate solution for the cell characteristic value(s) of a particular cell is referred to as an 'individual'. Each generation of chromosome strings may comprise, say, between 50 and 200 individual chromosome strings, each chromosome string comprising a different population of candidate solutions for the cell characteristic values. In the illustrated example of FIG. 3, the individuals within the first generation of chromosome strings comprise random cell characteristic values.

Referring back to FIG. 3, having generated the first generation of chromosome strings for the determined set of cells, the method moves on to 350 where the current (i.e. first in this instance) generation of chromosome strings are evaluated and given a fitness score. Such a fitness score for each chromosome string may be calculated based on signal strength information for signal strength measurements obtained by wireless communication subscriber units within the wireless communication network.

Figure 5:
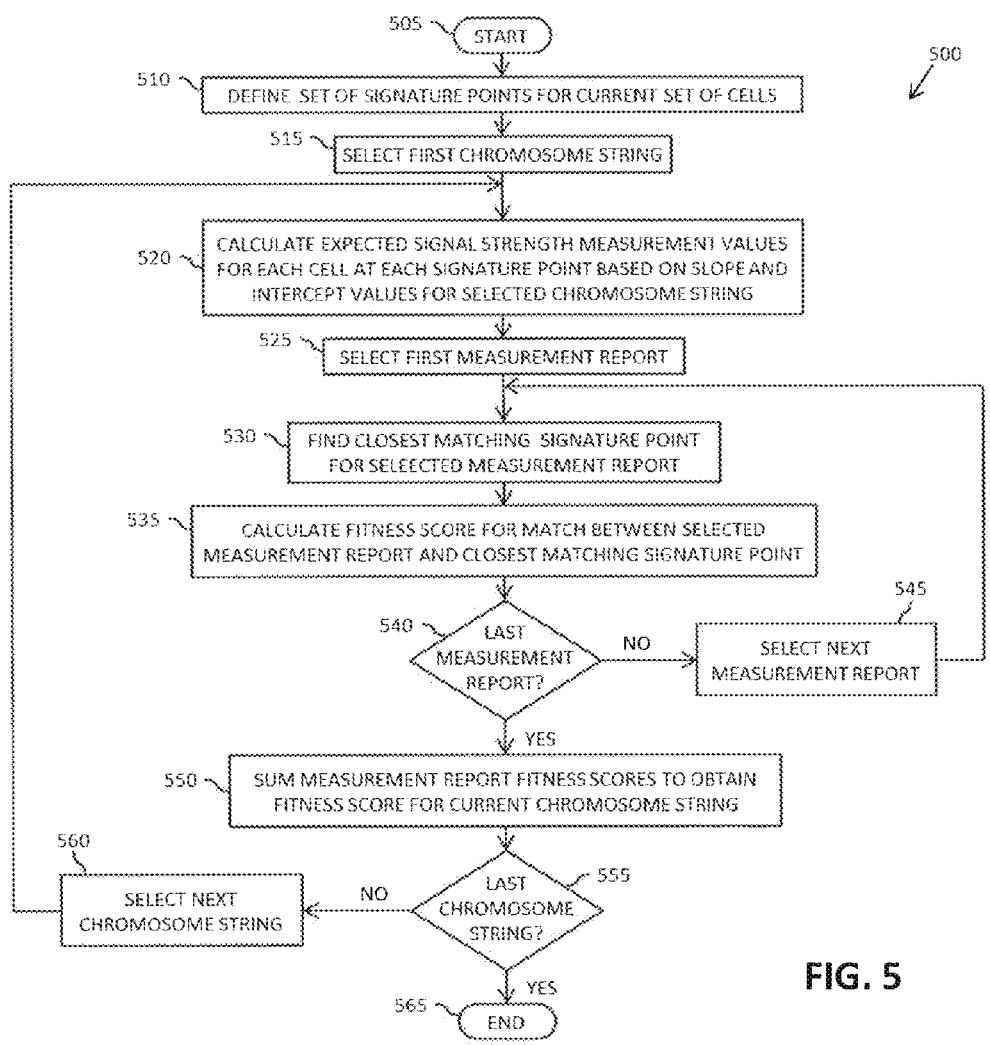
FIG. 5 illustrates a simplified flowchart of an example of a method for calculating a fitness score for a generation of chromosome strings.

In some examples, calculating a fitness score for a chromosome string may comprise defining a plurality of signature points, each signature point representing a geographical location. FIG. 5 illustrates a simplified flowchart 500 of an example of a method for calculating a fitness score for a generation of chromosome strings, such as may be implemented within step 350 of FIG. 3. The method of FIG. 5 starts at 505 and moves on to 510 where a set of signature points for the set of cells within the chromosome strings is defined, each signature point representing a geographical location.

For example, and as illustrated in FIG. 6, a grid 600 of signature points 610 may be defined. The grid 600 may be limited to being within the bounds 620 of the combined coverage areas for the set of cells to which the chromosome string relates. In the illustrated example, the signature points 610 are spaced 50 meters apart.

Referring back to FIG. 5, having defined the set of signature points, the method moves on to step 515 where a first chromosome string from the generation of chromosome strings is selected. Next, at step 520, an expected measurement value (i.e. signal strength value in the illustrated example) for each cell within the set of cells is then calculated at each signature point based on the known locations of the respective basestations for the cells (e.g. as defined within network configuration data for the wireless communication network) and, in the illustrated example, the slope and intercept values for the respective cells as defined in that particular chromosome string.

Having calculated the expected signal strength value for each cell at each signature point, the method moves on to step 525 where, in the illustrated example, a first measurement report is selected from a set of measurement reports corresponding to the set of cells to which the chromosome string relates. For example, in the example where the set of cells is determined by way of creating a 'bucket' for a particular (initial) cell ID and each measurement report message referencing the respective cell ID is placed within the corresponding bucket, the set of measurement reports may comprise the measurement reports within the respective bucket.

Having selected the first measurement report, the method moves on to step 530 where a closest matching signature point is found for the selected measurement report. For example, FIG. 7 illustrates a simplistic two dimensional visualisation of finding a closest matching signature point for a measurement report. In this illustrated example, the signal strength measurements within the selected measurement report are compared to the expected signal strength values at each signature point 610 (as calculated at step 520). The closest matching signature point, e.g. such as indicated at 710 in FIG. 7, may be determined based on, say, the signature point for which the measurement report comprises the largest number of Cell IDs matching the ten nearest cells/basestations to the signature point, the closest match between measured and expected signal strength values, etc.

Figure 8:
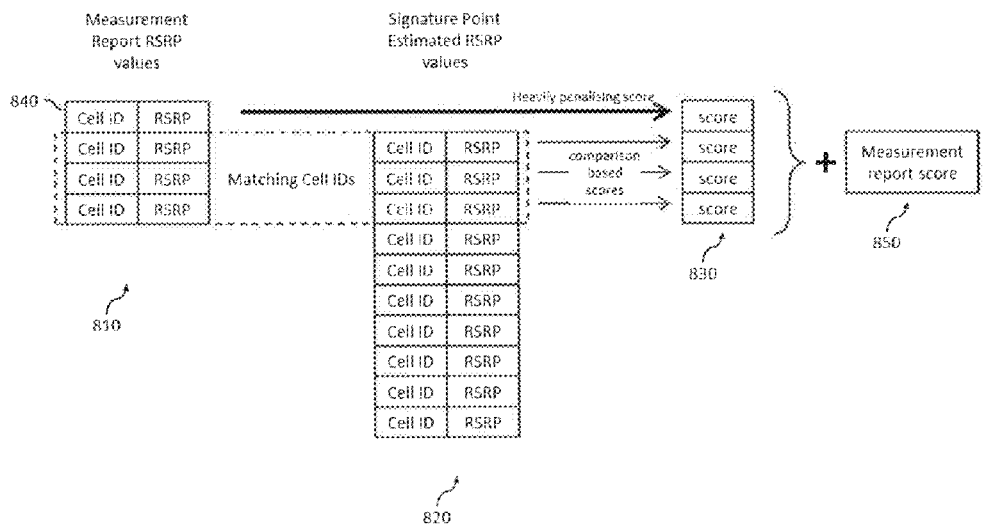
FIG. 8 illustrates a simplified example of calculating a fitness score for a match between a selected measurement report and a closest matching signature point.

Referring back to FIG. 5, having found the closest matching signature point for the selected measurement report, a fitness score is then calculated for the match between the selected measurement report and the closest matching signature point. For example, and as illustrated in FIG. 8, the selected measurement report 810 comprises a signal strength value (e.g. a Reference Signal Received Power (RSRP) in LTE parlance) corresponding to each of one or more cell IDs, the signal strength value representing a measured signal strength for respective cells visible to the UE at the time. Similarly, the closest matching signature set 820 comprises an expected signal strength value corresponding to each of one or more cell IDs, as calculated at step 520 in FIG. 5. In the example illustrated in FIG. 8, a score 830 is determined for each signal strength measurement within the measurement report 810 based on a comparison with corresponding expected signal strength values of the signature point for the respective cell IDs. In some examples, the comparison may be limited to, for example, the ten cell IDs for the signature point comprising the highest expected signal strength values. In the illustrated example, where no expected signal strength value is available for comparison with a measured signal strength value in the selected measurement report, such as the signal strength measurement value indicated at 840 in FIG. 8, the score for that measured signal strength value may be heavily penalised. The individual scores 830 for the measured signal strength values may then be added together to provide a fitness score 850 for the match between the selected measurement report and the closest matching signature point.

Referring back to FIG. 5, having calculated the fitness score for the match between the selected measurement report and the closest matching signature point, the method moves on to step 540, where it is determined whether a fitness score has been calculated for each measurement report (in the set of measurement reports). If it is determined that a fitness score has not been calculated for each measurement report, the method moves on to step 545 where the next measurement report is selected, and the method loops back to step 530 so that a fitness score for that measurement report can be calculated. Conversely, if it is determined that a fitness score has been calculated for each measurement report, the method moves on to step 550 where in the illustrated example the individual measurement report scores are summed to obtain a fitness score for the chromosome string. The method then moves on to step 555, where it is determined whether a fitness score has been calculated for each chromosome string (in the current generation of chromosome strings). If it is determined that a fitness score has not been calculated for each chromosome string, the method moves on to step 560 where the next chromosome string is selected, and the method loops back to step 520. Conversely, if it is determined that a fitness score has been calculated for each chromosome string, the method ends at 565.

Referring back to FIG. 3, having evaluated and scored the current (first) generation of chromosome strings, the method moves on to step 360 where it is determined whether a suitable solution has been found for, in the illustrated example, the signal strength attenuation characteristic values (i.e. slope and intercept values in the illustrated example) for the set of cells. For example, it may be determined that a chromosome string comprising a suitable solution for signal strength attenuation characteristic values for the set of cells has been found when no chromosome string in a succeeding generation of chromosome strings comprises a higher fitness score than that chromosome string.

In this instance, since the current generation of chromosome strings comprises the first generation of chromosome strings, it may be assumed that a suitable solution has not been found in this instance. Accordingly, the method moves on to step 370 where a next generation of chromosome strings is generated.

Figure 10:
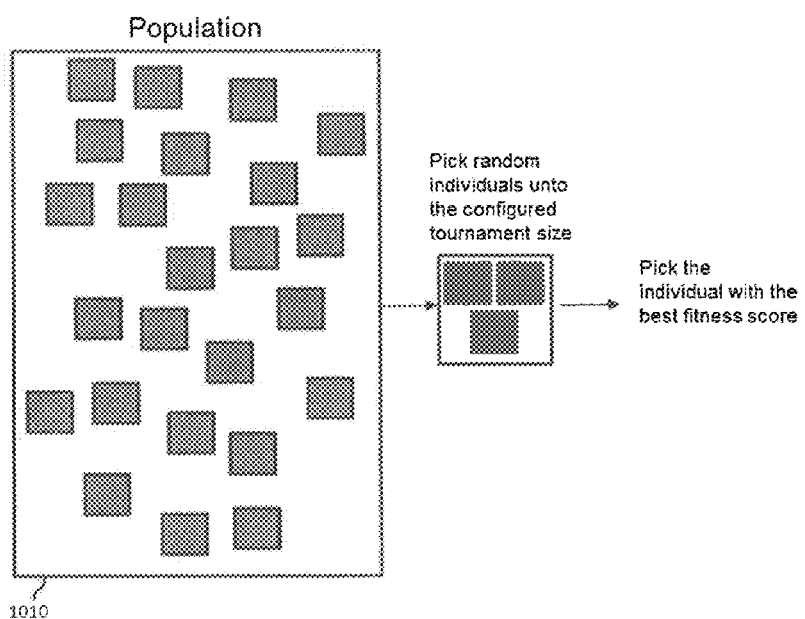
FIG. 10 illustrates an example of selecting individuals for parent chromosome strings.
Figure 9:
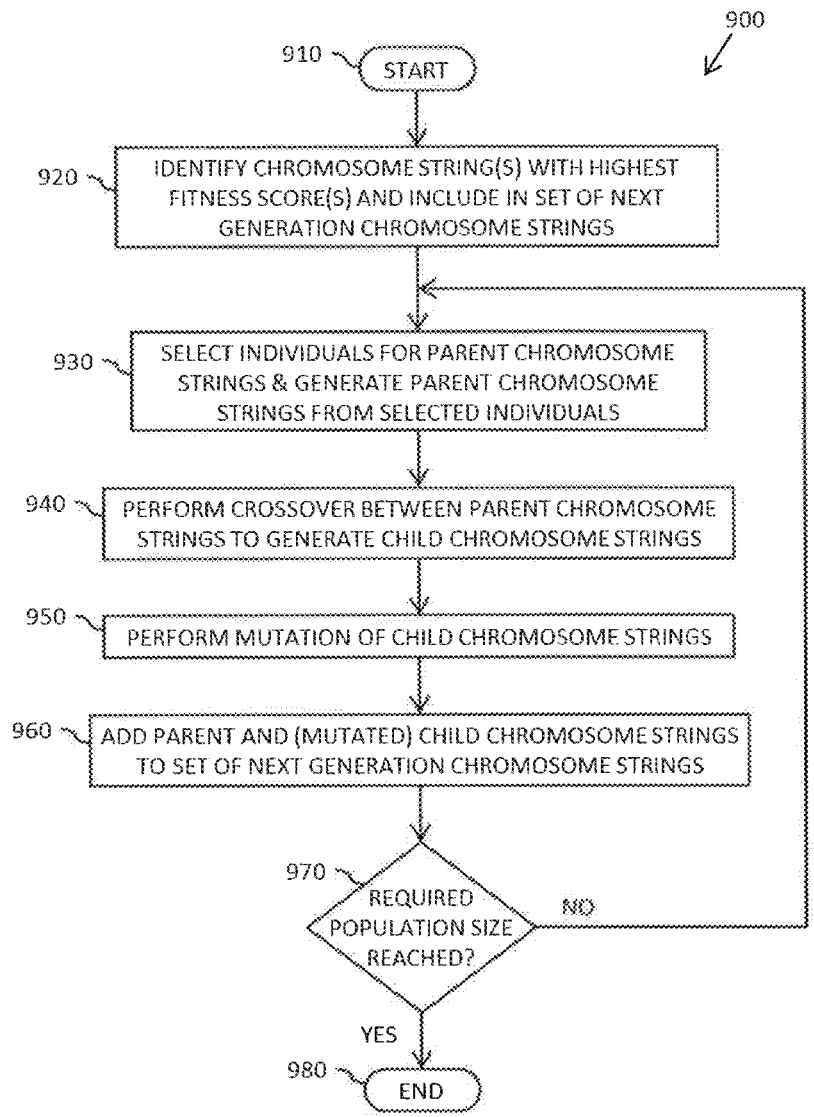
FIG. 9 illustrates a simplified flowchart of an example of a method of generating a next generation of chromosome strings.

FIG. 9 illustrates a simplified flowchart 900 of an example of a method of generating a next generation of chromosome strings. The method starts at 910, and moves on to step 920 where, in the illustrated example, chromosome strings from the most recent generation of chromosome strings comprising the highest fitness scores are identified and added to (i.e. to begin) a set of chromosome strings to comprise the next generation of chromosome strings. For example, the two highest scoring chromosome strings from the previous (i.e. most recent) generation of chromosome strings may be identified and added to the set of chromosome strings to comprise the next generation of chromosome strings. In this manner, the 'best' chromosome strings from the previous generation survive into the next generation. The method then moves on to step 930, where in the illustrated example individuals (i.e. candidate solutions for the signal strength attenuation characteristic values for the set of cells) are selected for parent chromosome, and such parent chromosome strings are generated from the selected individuals. For example, and as illustrated in FIG. 10, a set of individuals may be randomly selected from a 'population' 1010 of individuals comprising the set of individuals corresponding to a particular cell from all chromosome strings within the previous (most recent) generation of chromosome strings. In this manner, a randomly selected set of individuals corresponding to a particular cell is obtained from the respective population of individuals for that cell. From this randomly selected set of individuals, the individual comprising the best fitness score (e.g. based on the fitness score for the chromosome string from which the individual has come) may then be selected as the individual for the respective cell within a parent chromosome string. This may be repeated until an individual has been selected for all cells within the parent chromosome string, and thus a parent chromosome string may be generated. This may be repeated to generate (at least) two parent chromosome strings.

Figure 11:
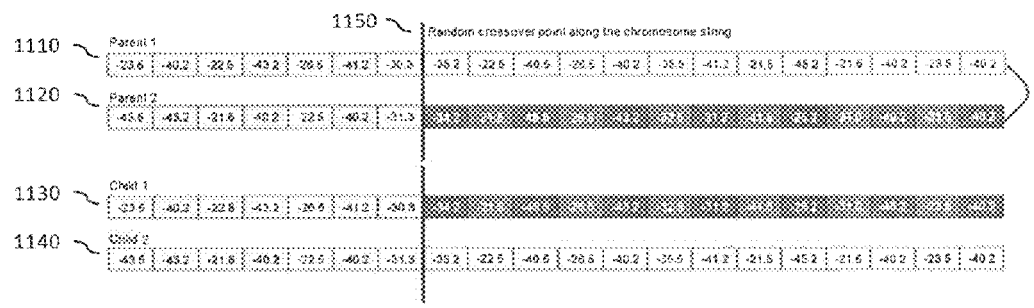
FIG. 11 illustrates an example of performing crossover between two parent chromosome strings.

Referring back to FIG. 9, having generated a pair of parent chromosome strings, one or more genetic algorithms may then be used to generate child chromosome strings from the parent chromosome strings. For example, and as illustrated in FIG. 9, the method may comprise performing 'crossover' between the parent chromosome strings, at step 940. FIG. 11 illustrates an example of performing crossover between two parent chromosome strings 1110, 1120 to generate two child chromosome strings 1130, 1140 therefrom. In the illustrated example, a random crossover point 1150 within the parent chromosome strings is determined. The individuals 'below' this crossover point 1150 within the parent chromosome strings are swapped such that the individuals below the crossover point 1150 within the first parent chromosome string 1110 become the individuals below the crossover point 1150 within the second 'child' chromosome string 1140, and the individuals below the crossover point 1150 within the second parent chromosome string 1120 become the individuals below the crossover point 1150 within the first 'child' chromosome string 1130.

Referring back to FIG. 9, having performed the crossover to generate the child chromosome strings, mutation of the generated child chromosome strings is then performed in the illustrated example, at step 950. Mutation is a genetic operator used to maintain genetic diversity from one generation of a population of genetic algorithm chromosome strings to the next. It is analogous to biological mutation. Mutation alters one or more gene values (individuals) in a chromosome string from its initial state. Such, mutation occurs according to a chosen mutation probability, and any such chosen mutation probability may be used to provide a suitable genetic diversity between parent and child chromosome strings.

The parent and mutated chromosome strings are then added to the set of next generation chromosome strings, at step 960. The non-mutated child chromosome strings may also be added to the set of next generation of chromosome strings.

The method then moves on to step 970, where it is determined whether a required population size for the next generation of chromosome strings has been reached. Such a required population size may be in the range of, say, 50 to 100 chromosome strings. If it is determined that the required population size has not been reached, then the method loops back to step 930. Conversely, if it is determined that the required population size has been reached, the method ends at 980.

Referring back to FIG. 3, having generated the next generation of chromosome strings, the method loops back to step 350 where the newly generated generation of chromosome strings are evaluated and given a fitness score. The method then moves on again to step 360 where it is determined whether a suitable solution has been found for the signal strength attenuation characteristic values for the set of cells in this next generation of chromosome strings. In this manner, the method comprises generating further generations of chromosome strings until at least one chromosome string comprising a suitable solution for signal strength attenuation characteristic values for the set of cells is found.

Once it is determined that a suitable solution for signal strength attenuation characteristic values for the set of cells is found, the method moves on to 380, where the signal strength attenuation values (i.e. slope and intercept values in the illustrated example) from the suitable solution are stored within one or more data storage devices, at step 380, and the method ends at 390.

Thus, an exemplary method of deriving cell characteristic information for cells within a wireless communication network, and in particular for the illustrated example a method of deriving signal strength attenuation characteristic information, has been described based on the use of a genetic algorithm. Advantageously, the use of genetic algorithms in this manner enables cell characteristic information to be derived on a per cell basis from measurement data provided by wireless communication subscriber units, and also to enable such information to be repeatedly derived using continuously received measurement data. As a result, the specific and ever changing environmental influences for individual cells can be taken into consideration to enable a more accurate modelling of cell characteristic contours for individual cells to be achieved. Specifically, for the example illustrated in FIG. 3, the derived cell-specific signal strength attenuation characteristic values may be used to model signal strength contours for individual cells to enable, for example, UEs to be geolocated based on received signal strength measurements therefrom. Furthermore, any changes over time to the cell characteristics for cells within the network can be identified and taken into consideration. For example, in more rural environments, changes in plant and tree foliage due to changes in season may be modelled. Furthermore, changes in urban/suburban environments due to new buildings etc. being constructed can also be adapted for.

Although the present invention has been illustrated and described in relation to deriving signal strength attenuation characteristics for cells within an wireless communication network using genetic algorithms, it will be appreciated that the present invention is not limited to the use of genetic algorithms to derive signal strength attenuation characteristics, and it is contemplated that the present invention may equally be applied to the derivation of any alternative form of cell characteristic values.

For example, the method of FIGS. 3 to 11 may be adapted to enable the derivation of cell characteristics such as, say, signal-to-noise ratio (SNR) characteristics for cells. In such an alternative example, each chromosome string may comprise SNR slope and intercept values for each cell within the determined set of cells. In this manner, the derived cell specific SNR slope and intercept values may be used to model SNR contours for individual cells to enable, for example, UEs to be geolocated based on SNR measurements therefrom.

In some alternative examples, the method of FIGS. 3 to 11 may be adapted to enable the derivation of, say, timing offset characteristics for cells. In such an alternative example, each chromosome string may comprise timing offset values with respect to a centralised timing reference for each cell within the determined set of cells. For example, replacing the slope and intercept values for each cell from the signal strength attenuation characteristics example being replaced with a timing offset value representing a timing difference between the timing source for the cell's basestation and a centralised (master) timing source. In this manner, the derived cell specific timing offset characteristic values may be used in conjunction with timing difference contours for individual cells to enable, for example, UEs to be geolocated based on cell timing measurements therefrom.

Furthermore, although one example of the use of a genetic algorithm has been illustrated and described for deriving cell characteristic values, it will be appreciated that the present invention is not limited to the specific example herein described with reference to the accompanying drawings. For example, it is contemplated that any suitable form of genetic algorithm may be used to derive the cell characteristic values. For clarity, the term genetic algorithm used herein refers to a heuristic algorithm used to 'evolve' candidate solutions to an optimization problem, such as the problem of deriving cell characteristic values, in order to obtain 'better' solutions.

Figure 12:
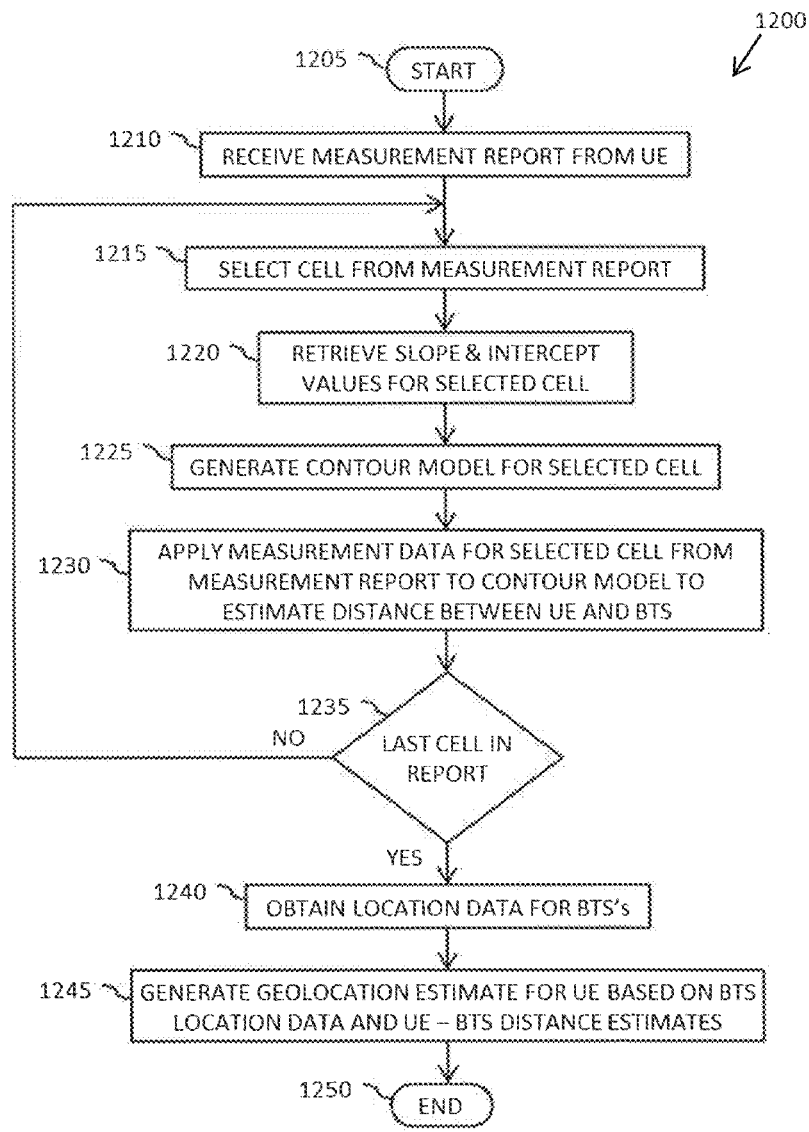
FIG. 12 illustrates a simplified flowchart of an example of a method of geolocating a wireless communication subscriber unit.

FIG. 12 illustrates a simplified flowchart 1200 of an example of a method of geolocating a wireless communication subscriber unit. For example, FIG. 12 may illustrate an example of geolocating a wireless communication subscriber unit using signal strength measurement report data and signal strength attenuation characteristic values for cells within a wireless communication network. The method starts at 1205, and moves on to step 1210 where a measurement report from the wireless communication subscriber unit (UE) is received comprising, for example, signal strength measurement data for a set of cells. Next, at step 1215, a cell from the set of cells for which the measurement report comprises measurement data is selected. Cell characteristic information, for example signal strength attenuation characteristic information, (which in the illustrated example comprises slope and intercept values) is then retrieved from a data storage device at step 1220. In particular, cell characteristic information derived by way of a genetic algorithm based on measurement information received from wireless communication subscriber units, such as the method of FIG. 3, is retrieved. A contour model is then generated for the selected cell based on the retrieved cell characteristic information at step 1225. For example, the slope and intercept values for the illustrated example may be used to derive radial distance values for signal strength contours relative to a basestation antenna of the selected cell. The measurement data within the receive measurement report for the selected cell is then applied to the generated contour model to estimate a distance between the wireless communication subscriber unit and the basestation/antenna for the selected cell, at step 1230. Having estimated the distance between the wireless communication subscriber unit and the selected cell basestation/antenna, the method moves on to step 1235 where it is determined whether the selected cell is the last cell in the measurement report. If it is determined that the selected cell is not the last cell in the measurement report, the method loops back to step 1215, where the next cell in the measurement report is selected. Conversely, if it is determined that the selected cell is the last cell in the measurement report, the method moves on to step 1240, where location data for the basestations/antennas of the set of cells is obtained, for example from a network configuration database or the like. A geolocation estimate for the wireless communication subscriber unit is then generated at step 1245 based on locations of the basestations/antennas of the set of cells and the estimated distances between the wireless communication subscriber unit and the basestations/antennas of the set of cells. The method then ends at 1250.

As previously mentioned, the present invention is not limited to the use of genetic algorithms to derive signal strength attenuation characteristics, and the method of FIGS. 3 to 11 may be adapted to enable the derivation of alternative forms of cell characteristics such as signal-to-noise ratio (SNR) and/or timing offset values for cells. Accordingly, it is contemplated that the method of FIG. 12 may equally be adapted to a method of geolocating a wireless communication subscriber unit using such alternative characteristic values for cells within a wireless communication network. For example, step 1220 may be adapted to additionally/alternatively comprise retrieving SNR slope and intercept values for the selected cell, the SNR slope and intercept values having been derived by way of a genetic algorithm based on SNR measurement information received from wireless communication subscriber units. The retrieved SNR slope and intercept values may then be used to generate an SNR model for the selected cell at step 1225. For example, the SNR slope and intercept values for the illustrated example may be used to derive radial distance values for SNR contours relative to a basestation antenna of the selected cell. The SNR measurement data within the received measurement report for the selected cell is then applied to the generated SNR model to estimate a distance between the wireless communication subscriber unit and the basestation/antenna for the selected cell, at step 1230. The rest of the method of FIG. 12 remaining substantially as described in relation to the use of signal strength measurement data.

Figure 13:
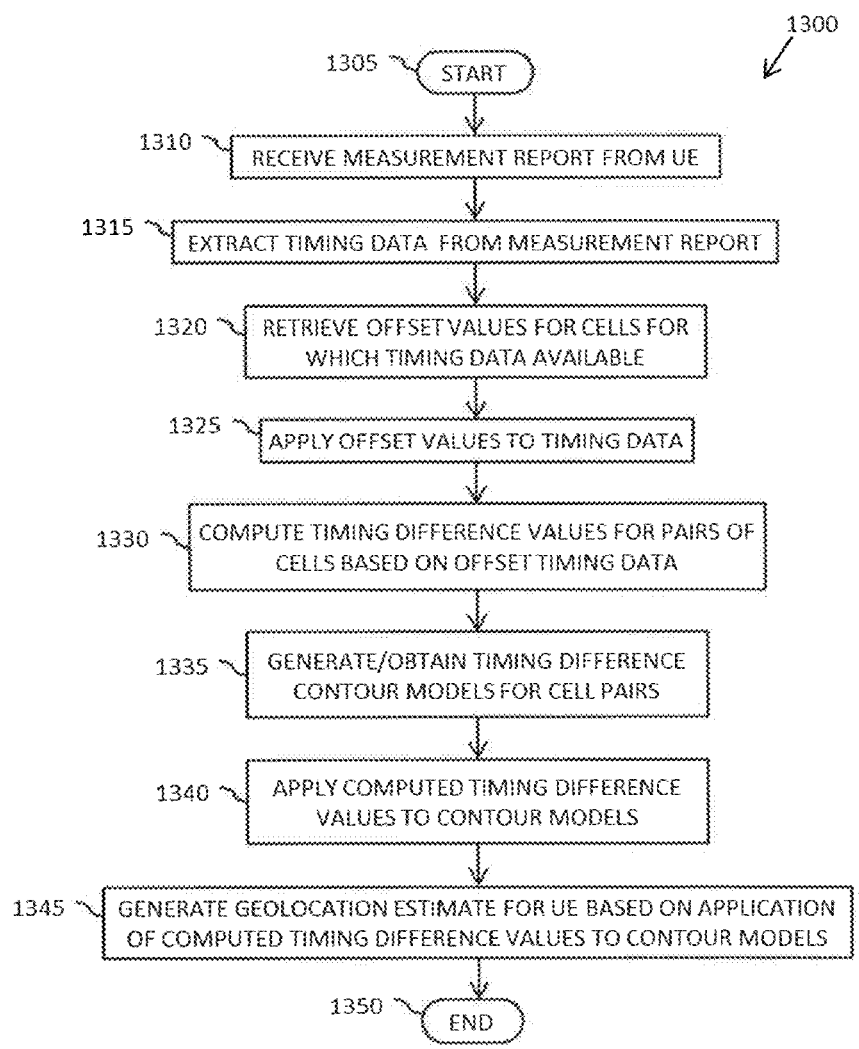
FIG. 13 illustrates a simplified flowchart of an alternative example of a method of geolocating a wireless communication subscriber unit.

FIG. 13 illustrates a simplified flowchart 1300 of a further example of a method of geolocating a wireless communication subscriber unit. In particular, FIG. 13 illustrates an example of geolocating a wireless communication subscriber unit using timing measurement data and timing offset values for cells within a wireless communication network. The method starts at 1305, and moves on to step 1310 where a measurement report from the wireless communication subscriber unit (UE) is received comprising, in the example of FIG. 13, timing measurement data for a set of cells. For example, the timing measurement data may comprise timing information indicating transmit times for signals received by the UE from a set of cells at substantially the same point in time. The transmit times for the signals will be according to local timing sources of the respective cell basestations from which the signals were transmitted. The timing measurement information is extracted from the received measurement report, at 1315. Next, at 1320, timing offset values for cells for which timing data is available are retrieved. In particular, timing offset values derived by way of a genetic algorithm based on measurement information received from wireless communication subscriber units, such as the method of FIG. 3, is retrieved. Each timing offset value represents an offset between the local timing source for the respective cell and a central timing source. The timing offset values are then applied to the extracted timing data, at 1325, thereby effectively synchronising the timing data for the different cells. Timing difference values are then computed for pairs of cells based on the offset timing data, at 1330, each timing difference value representing a difference in journey times for signals travelling between the respective basestations and the UE. Timing difference contour models are then generated, or otherwise obtained, for the pairs of cells for which timing difference values have been computed, at 1335. Due to the relatively predictable nature of the speed at which RF signals are able to travel between two points, such timing difference models may simply be generated (in advance or on-the-fly) based on simple mathematical modelling using the known (relative) locations of the basestations. The timing difference values may then be applied to the timing difference contour models, at step 1340, and a geolocation estimate for the UE may be generated based on the application of the computed timing difference values to the contour models, at 1345. The method then ends at 1350.

It will be appreciated that the present invention may be applied to still further forms of cell characteristic values, and a skilled person would be readily able to adapt the methods of FIGS. 3 to 13 accordingly. Further examples of such further forms of cell characteristic values include, by way of example only, Arbitrary Strength Unit (ASU) data, OTDOA (Observed Time Difference Of Arrival), etc. Indeed, it is contemplated that such cell characteristic values derived by way of the present invention may comprise substantially any cell specific parameter which decays or degrades or alters with distance between a wireless communication subscriber unit and a cell-site. Further examples of such cell characteristic values may comprise data rate (which typically lowers with increasing separation), throughput (which, again, typically lowers with increasing separation), modulation format used (in a system where the modulation format adapts to the quality of the channel, for example going from 64-QAM when the channel quality is good (typically=small separation), down to 16-QAM, then QPSK as the quality degrades) or the number of errors which the error-correction coding system needs to correct (this number will increase, typically, with increased separation).

Figure 14:
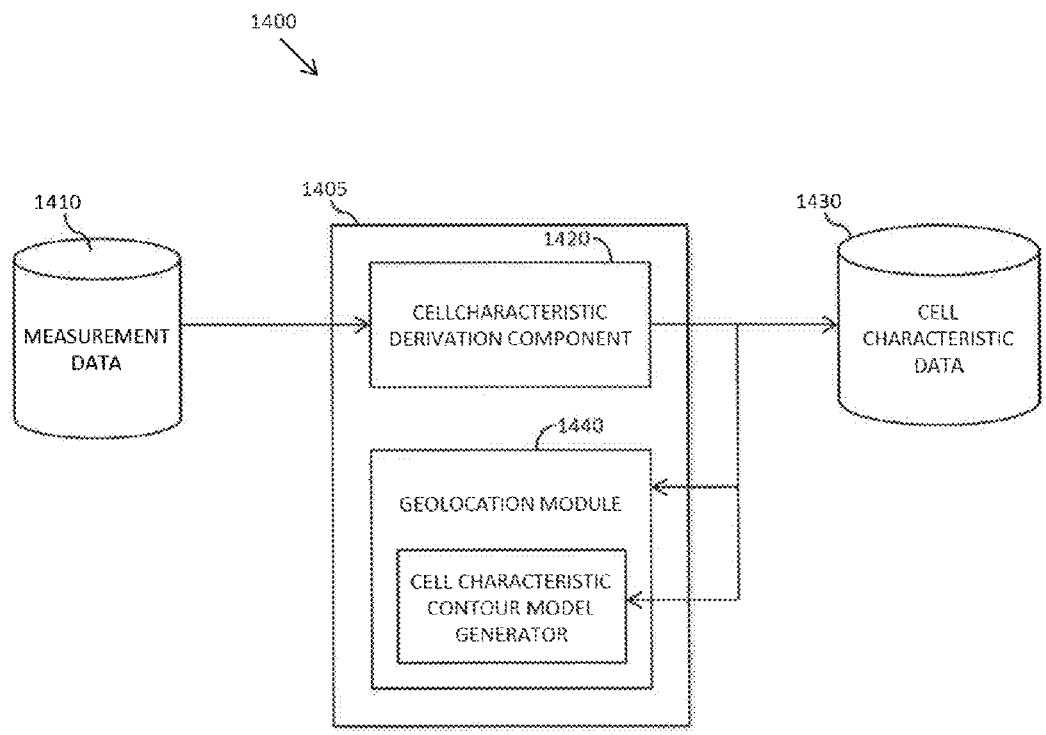
FIG. 14 illustrates a simplified block diagram of an example of a geolocation system.

Referring now to FIG. 14, there is illustrated a simplified block diagram of an example of a geolocation system 1400. The geolocation system 1400 may be implemented in any suitable manner. For example, and as illustrated in FIG. 14, the geolocation system 1400 may be implemented at least in part by way of one or more processing modules 1405 arranged to execute computer program code. The computer program code may be stored within one or more non-transitory computer program products, for example such as one or more memory element(s). Such memory element(s) may comprise any form of computer-readable storage device, such as a hard disc, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

In particular, the geolocation system 1400 illustrated in FIG. 14 comprises a cell characteristic derivation component 1420 (in the form of computer program code executing on the processing module(s) 1405), the cell characteristic derivation component 1420 being arranged to implement a method of deriving cell characteristic values for cells within a wireless communication network, such as the method hereinbefore described with reference to FIGS. 3 to 11. In the illustrated example, the geolocation system 1400 is operably coupled to a data storage device 1410 in which cell measurement data received from wireless communication subscriber units is stored, and is arranged to receive cell measurement data from the data storage device 1410. The geolocation system 1400 is further operably coupled to a data storage device 1430 within which the cell characteristic derivation component 1420 is arranged to store cell characteristic values. In some examples, the data storage device 1420 and the data storage device 1430 may be realised by way of a single data storage device.

In the illustrated example, the geolocation system 1400 further comprises a geolocation module 1440 (in the form of computer program code executing on the processing module(s) 1405), arranged to perform geolocation of wireless communication subscriber units, such as the method hereinbefore described with reference to FIG. 12 and/or the method hereinbefore described with reference to FIG. 13. In the illustrated example, the geolocation module 1440 comprises a cell characteristic contour model generator component 1445 arranged to generate cell characteristic contours for cells within a wireless communication network based on cell characteristic data derived by the cell characteristic derivation component 1420, and stored within the data storage device 1430.

Figure 15:
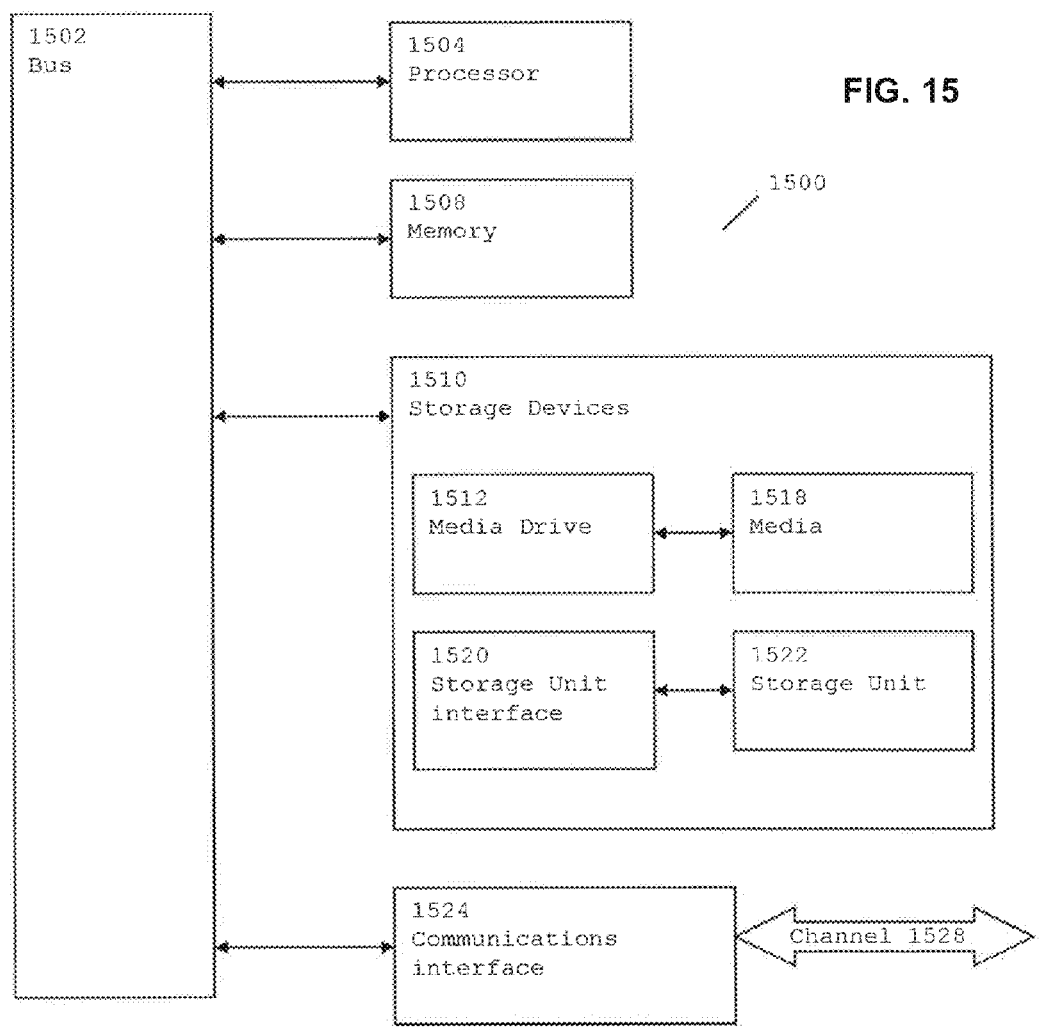
FIG. 15 illustrates a typical computing system that may be employed to implement data processing functionality in embodiments of the invention.

Referring now to FIG. 15, there is illustrated a typical computing system 1500 that may be employed to implement signal processing functionality in embodiments of the invention. For example, a computing system of this type may be used within the geolocation system 1400 of FIG. 14. Those skilled in the relevant art will also recognize how to implement the invention using other computer systems or architectures. Computing system 1500 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1500 can include one or more processors, such as a processor 1504. Processor 1504 can be implemented using a general or special-purpose processing engine such as, for example, a microprocessor, microcontroller or other control module. In this example, processor 1504 is connected to a bus 1502 or other communications medium.

Computing system 1500 can also include a main memory 1508, such as random access memory (RAM) or other dynamic memory, for storing information and instructions to be executed by processor 1504. Main memory 1508 also may be used for storing temporary variables or other intermediate information during execution of instructions to be executed by processor 1504. Computing system 1500 may likewise include a read only memory (ROM) or other static storage device coupled to bus 1502 for storing static information and instructions for processor 1504.

The computing system 1500 may also include information storage system 1510, which may include, for example, a media drive 1512 and a removable storage interface 1520. The media drive 1512 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1518 may include, for example, a hard disk, floppy disk, magnetic tape, optical disk, CD or DVD, or other fixed or removable medium that is read by and written to by media drive 1512. As these examples illustrate, the storage media 1518 may include a computer-readable storage medium having particular computer software or data stored therein.

In alternative embodiments, information storage system 1510 may include other similar components for allowing computer programs or other instructions or data to be loaded into computing system 1500. Such components may include, for example, a removable storage unit 1522 and an interface 1520, such as a program cartridge and cartridge interface, a removable memory (for example, a flash memory or other removable memory module) and memory slot, and other removable storage units 1522 and interfaces 1520 that allow software and data to be transferred from the removable storage unit 1518 to computing system 1500.

Computing system 1500 can also include a communications interface 1524. Communications interface 1524 can be used to allow software and data to be transferred between computing system 1500 and external devices. Examples of communications interface 1524 can include a modem, a network interface (such as an Ethernet or other NIC card), a communications port (such as for example, a universal serial bus (USB) port), a PCMCIA slot and card, etc. Software and data transferred via communications interface 1524 are in the form of signals which can be electronic, electromagnetic, and optical or other signals capable of being received by communications interface 1524. These signals are provided to communications interface 1524 via a channel 1528. This channel 1528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1508, storage device 1518, or storage unit 1522. These and other forms of computer-readable media may store one or more instructions for use by processor 1504, to cause the processor to perform specified operations. Such instructions, generally referred to as 'computer program code' (which may be grouped in the form of computer programs or other groupings), when executed, enable the computing system 1500 to perform functions of embodiments of the present invention. Note that the code may directly cause the processor to perform specified operations, be compiled to do so, and/or be combined with other software, hardware, and/or firmware elements (e.g. libraries for performing standard functions) to do so.

As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being "non-transitory" whereas a signal carrier in transit is to be considered "transitory" notwithstanding that the signal may remain in transit for a lengthy period of time.

In an embodiment where the elements are implemented using software, the software may be stored in a computer-readable medium and loaded into computing system 1500 using, for example, removable storage drive 1522, drive 1512 or communications interface 1524. The control module (in this example, software instructions or computer program code), when executed by the processor 1504, causes the processor 1504 to perform the functions of the invention as described herein.

Furthermore, the inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other subsystem element.

It will be appreciated that, for clarity purposes, the above description has described embodiments of the invention with reference to different functional units and processors. However, it will be apparent that any suitable distribution of functionality between different functional units or processors may be used without detracting from the invention. For example, functionality illustrated to be performed by the same processor or controller may be performed by separate processors or controllers. Hence, references to specific functional units are only to be seen as references to suitable means for providing the described functionality, rather than indicative of a strict logical or physical structure or organization.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader spirit and scope of the invention as set forth in the appended claims. Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method comprising:
   receiving, by a server, first measurement data from wireless communication subscriber units within a wireless communication network,
      the first measurement data being associated with a first set of cells for which cell characteristic values are to be derived;
   deriving the cell characteristic values for the first set of cells based on the first measurement data,
      the cell characteristic values comprising timing offset values;
   receiving, by the server, second measurement data for a second set of cells within the wireless communication network obtained by a wireless communication subscriber unit,
      the second measurement data comprising timing data;
   applying, by the server, the timing offset values to the timing data included in the second measurement data to obtain offset timing data;
   computing, by the server, timing difference values for pairs of cells based on the offset timing data;
   applying, by the server, the computed timing difference values to contour models; and
   determining, by the server, a geolocation of the wireless communication subscriber unit based on the computed timing difference values applied to the contour models.

2. The method of claim 1, wherein the cell characteristic values to be derived comprise at least one cell specific parameter which decays or degrades or alters with distance between a particular wireless communication subscriber unit and a cell-site.

3. The method of claim 1, wherein the method further comprises:
   determining the first set of cells;
   generating a first generation of chromosome strings,
      each chromosome string comprising at least one cell characteristic value for each cell within the determined first set of cells;
   calculating a fitness score for each chromosome string within the first generation of chromosome strings based on measurement data obtained by one or more first wireless communication subscriber units within the wireless communication network;
   generating at least one further generation of chromosome strings;
   calculating a fitness score for each chromosome string within the at least one further generation of chromosome strings based on measurement data obtained by one or more second wireless communication subscriber units within the wireless communication network; and
   deriving the cell characteristic values for the first set of cells based on the fitness score calculated for each chromosome string within the first generation of chromosome strings and the fitness score calculated for each chromosome string within the at least one further generation of chromosome strings.

4. The method of claim 3, wherein the first generation of chromosome strings comprises random cell characteristic values.

5. The method of claim 3, wherein calculating the fitness score for a chromosome string comprises:
   defining a plurality of signature points,
      each signature point representing a geographical location;
   calculating an expected measurement value for at least one cell at each signature point;
   matching each of a plurality of measurement reports received from wireless communication subscriber units to one of the signature points based on the expected measurement values for the signature points;

calculating a fitness score for each measurement report based on each expected measurement value for the respective signature point and corresponding information from the measurement report; and
calculating the fitness score for the chromosome string based on the calculated fitness scores for the plurality of measurement reports.

6. The method of claim 5, wherein the method comprises:
calculating the fitness scores for the chromosome string by summing the fitness scores for the measurement reports.

7. The method of claim 3, wherein generating at least one further generation of chromosome strings comprises:
deriving parent chromosome strings to form part of the at least one further generation of chromosome strings; and
performing a crossover between parent chromosome strings to generate child chromosome strings to form part of the at least one further generation of chromosome strings.

8. The method of claim 7, wherein generating the at least one further generation of chromosome strings further comprises:
performing mutation of the child chromosome strings.

9. The method of claim 7, wherein generating the at least one further generation of chromosome strings comprises:
identifying at least one chromosome string from a current generation of chromosome strings comprising a highest fitness score out of a plurality of fitness scores; and
including the identified at least one chromosome string from the current generation of chromosome strings in the at least one further generation of chromosome strings.

10. The method of claim 3, wherein the method further comprises:
generating further generations of chromosome strings until at least one chromosome string comprising a suitable solution for cell characteristic values for the first set of cells is found.

11. The method of claim 10, wherein a chromosome string comprising a suitable solution for cell characteristic values for the first set of cells is found when no chromosome string in a succeeding generation of chromosome strings comprises a higher fitness score than that chromosome string.

12. The method of claim 1, wherein the cell characteristic values comprise at least one of:
signal strength characteristic values;
timing offset characteristic values;
observed time difference of arrival values; or
signal-to-noise characteristic values.

13. The method of claim 1, wherein the method further comprises:
storing the derived cell characteristic values within at least one data storage device.

14. The method of claim 1, further comprising:
deriving at least one cell characteristic value for at least one cell within the wireless communication network; and
generating a cell characteristic contour model for the at least one cell based on the at least one cell characteristic value.

15. A non-transitory computer-readable medium storing instructions, the instructions comprising:
one or more instructions that, when executed by one or more processors of a server, cause the one or more processors to:
receive first measurement data from wireless communication subscriber units within a wireless communication network,
the first measurement data being associated with a first set of cells for which cell characteristic values are to be derived;
derive the cell characteristic values for the first set of cells based on the first measurement data obtained by the wireless communication subscriber units,
the cell characteristic values comprising timing offset values;
receive second measurement data for a second set of cells within the wireless communication network obtained by a wireless communication subscriber unit,
the second measurement data comprising timing data;
apply the timing offset values to the timing data included in the second measurement data to obtain offset timing data;
compute timing difference values for pairs of cells based on the offset timing data;
apply the computed timing difference values to contour models; and
determine a geolocation of the wireless communication subscriber unit based on the computed timing difference values applied to the contour models.

16. The non-transitory computer-readable medium of claim 15, wherein the instructions further comprise one or more instructions to:
derive at least one cell characteristic value for at least one cell within the wireless communication network; and
generate a cell characteristic contour model for the at least one cell based on the at least one cell characteristic value.

17. The non-transitory computer-readable medium of claim 15, wherein the cell characteristic values comprise at least one of:
signal strength characteristic values;
timing offset characteristic values;
observed time difference of arrival values; or
signal-to-noise characteristic values.

18. A geolocation system comprising:
a server configured to:
receive first measurement data from wireless communication subscriber units within a wireless communication network,
the first measurement data being associated with a first set of cells for which cell characteristic values are to be derived;
derive the cell characteristic values for the first set of cells based on the first measurement data,
the cell characteristic values comprising timing offset values;
receive second measurement data for a second set of cells within the wireless communication network obtained by a wireless communication subscriber unit,
the second measurement data comprising timing data;
apply the timing offset values to the timing data included in the second measurement data to obtain offset timing data;
compute timing difference values for pairs of cells based on the offset timing data;
apply the computed timing difference values to contour models; and determine a geolocation of the wireless communication subscriber unit based on the computed timing difference values applied to the contour models.

19. The geolocation system of claim 18, wherein the server is further configured to:
   generate a first generation of chromosome strings,
      each chromosome string comprising at least one cell characteristic value for each cell within the first set of cells;
   calculate a fitness score for each chromosome string within the first generation of chromosome strings based on measurement data obtained by one or more first wireless communication subscriber units within the wireless communication network;
   generate at least one further generation of chromosome strings;
   calculate a fitness score for each chromosome string within the at least one further generation of chromosome strings based on measurement data obtained by one or more second wireless communication subscriber units within the wireless communication network; and
   derive the cell characteristic values for the first set of cells based on the fitness score calculated for each chromosome string within the first generation of chromosome strings and the fitness score calculated for each chromosome string within the at least one further generation of chromosome strings.

20. The geolocation system of claim 18, wherein the server is further configured to:
   derive at least one cell characteristic value for at least one cell within the wireless communication network; and
   generate a cell characteristic contour model for the at least one cell based on the at least one cell characteristic value.

21. The geolocation system of claim 18, wherein the cell characteristic values comprise at least one of:
   signal strength characteristic values;
   timing offset characteristic values;
   observed time difference of arrival values; or
   signal-to-noise characteristic values.

* * * * *